United States Patent [19]

Brasen et al.

[11] Patent Number: 5,481,469
[45] Date of Patent: Jan. 2, 1996

[54] AUTOMATIC POWER VECTOR GENERATION FOR SEQUENTIAL CIRCUITS

[75] Inventors: Daniel R. Brasen, Grenoble Cedex; Christophe Gauthron, La Colle sur Loup, both of France

[73] Assignee: VLSI Technology, Inc., San Jose, Calif.

[21] Appl. No.: 430,245

[22] Filed: Apr. 28, 1995

Related U.S. Application Data

[63] Continuation of Ser. No. 120,627, Sep. 13, 1993, abandoned.

[51] Int. Cl.$^6$ ........................................... G06F 15/60
[52] U.S. Cl. ..................... 364/483; 364/491; 364/580; 364/578; 371/27
[58] Field of Search ..................... 364/480, 481, 364/483, 488–491, 578, 580; 371/22.1, 22.2, 22.6, 23, 24, 26, 27; 395/500; 324/765, 73.1

[56] References Cited

U.S. PATENT DOCUMENTS

| | | | |
|---|---|---|---|
| 4,827,428 | 5/1989 | Dunlop et al. | 364/491 |
| 4,954,951 | 9/1990 | Hyatt | 395/425 |
| 5,122,800 | 6/1992 | Philipp | 364/484 |
| 5,162,812 | 11/1992 | Aman et al. | 375/34 |
| 5,228,040 | 7/1993 | Agrawal et al. | 371/22.1 |
| 5,237,593 | 8/1993 | Fisher et al. | 345/115 |
| 5,345,393 | 9/1994 | Ueda | 364/489 |

OTHER PUBLICATIONS

IEEE Transitions on Computer–Aided Design, "Test Generation for Sequential Circuits", vol. 7, No. 10, by Hi–Keung Tony Ma et al, pp. 1081–1093 (Oct. 1988).
IEEE 1990 Custom Integrated Circuits Conference, "Estimation of Power Dissipation in CMOS Combinational Circuits" by Srinvas Devadas et al., pp. 19.7.1–19.7.6 (1990).
IEEE, "Estimating Dynamic Power Consumption of CMOS Circuits" by Mehmet A. Cirit, pp. 534–537 (1987).
IEEE, "Hercules" A Power Analyzer for MOS VLSI Circuits by Akhilesh Tyagi, University of Washington, Seattle, pp. 530–533 (1987).
25th ACM/IEEE Design Automation Conference, Paper 21.3, "Pattern–Independent Current Estimation for Reliability Analysis of CMOS Circuits" by Richard Burch et al. (1988).

*Primary Examiner*—Emanuel T. Voeltz
*Assistant Examiner*—Kyle J. Choi
*Attorney, Agent, or Firm*—Burns, Doane, Swecker and Mathis

[57] ABSTRACT

A method for automatic power vector generation for sequential circuits produces input vectors for a power simulation required for accurate calculation of power dissipation of logic elements. More particularly, a worst-case-power-consumption logic vector pair for a sequential circuit is automatically generated by determining the worst-case-power-consumption logic vector pair, the second worst-case-power-consumption logic vector pair, up to the Nth worst-case-power-consumption logic vector pair in the combinational logic portion of the sequential circuit. The following is determined with respect to each of the N vector pairs: whether a feedback portion of a second logic vector in the logic vector pair is consistent with a feedback portion of a first logic vector output signal of the sequential circuit produced in response to a first logic vector in the logic vector pair, signifying that the second logic vector can be produced from the first logic vector; and, a setup vector sequence, for the first logic vector, of one or more logic vectors that when applied to the sequential circuit causes the feedback portion of the first logic vector to be produced, if such a setup sequence can be found. This procedure continues until for a particular logic vector pair the second logic vector can be produced from the first logic vector, and a setup sequence for the first logic vector has been found. The particular logic vector pair is then the worst-case-power-consumption logic vector pair. The worst-case-power-consumption logic vector pair and corresponding set-up vector sequence can then be used with a power simulation to find worst-case-power-consumption of the sequential circuit.

1 Claim, 4 Drawing Sheets

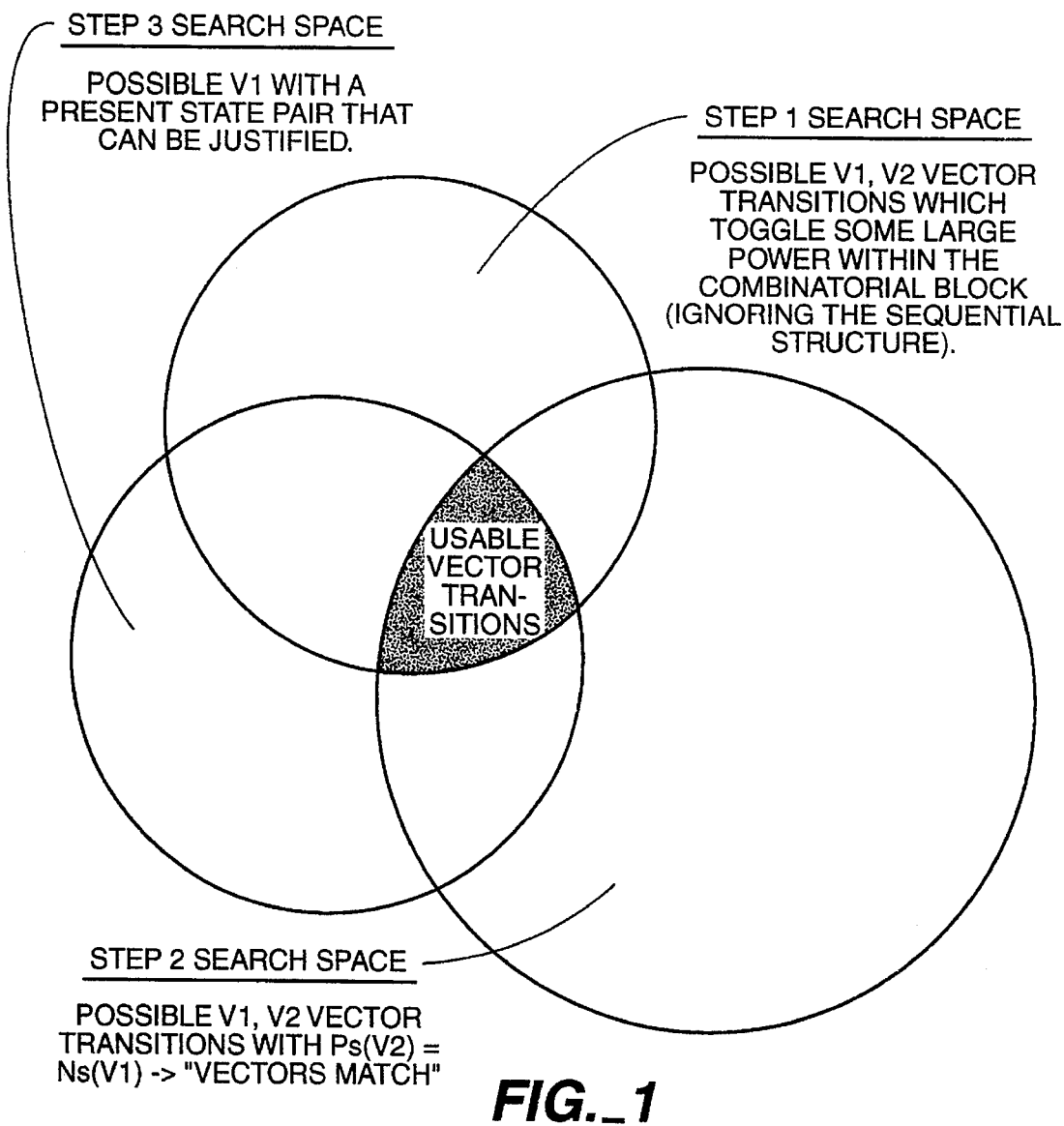
FIG._1
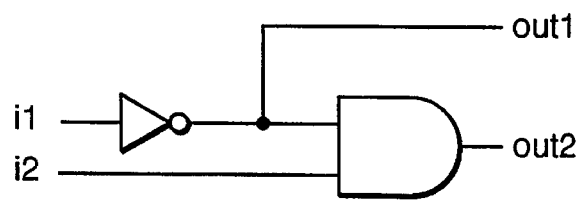
FIG._3

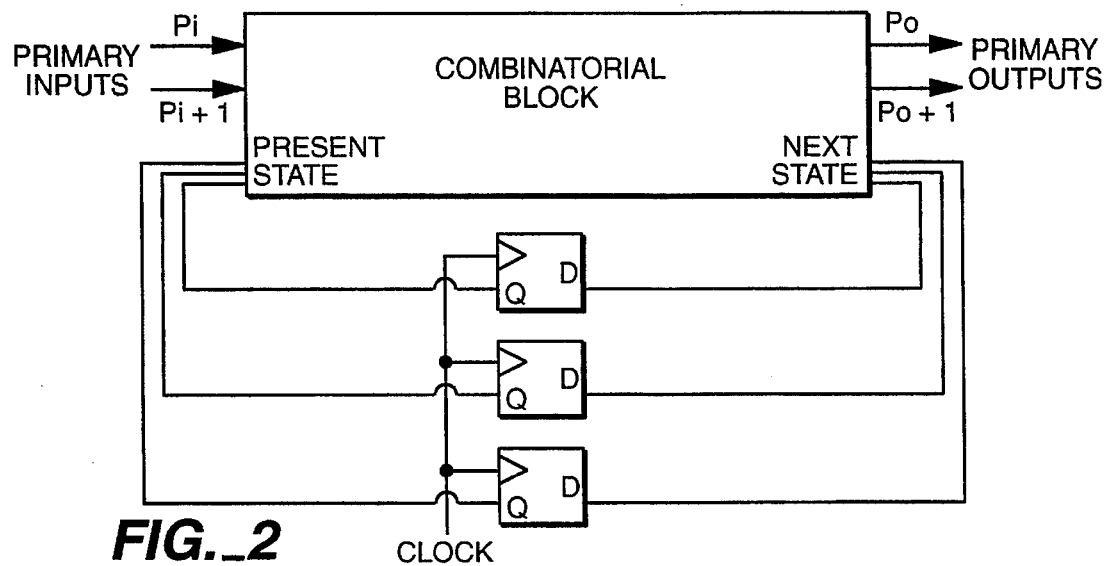
FIG._2
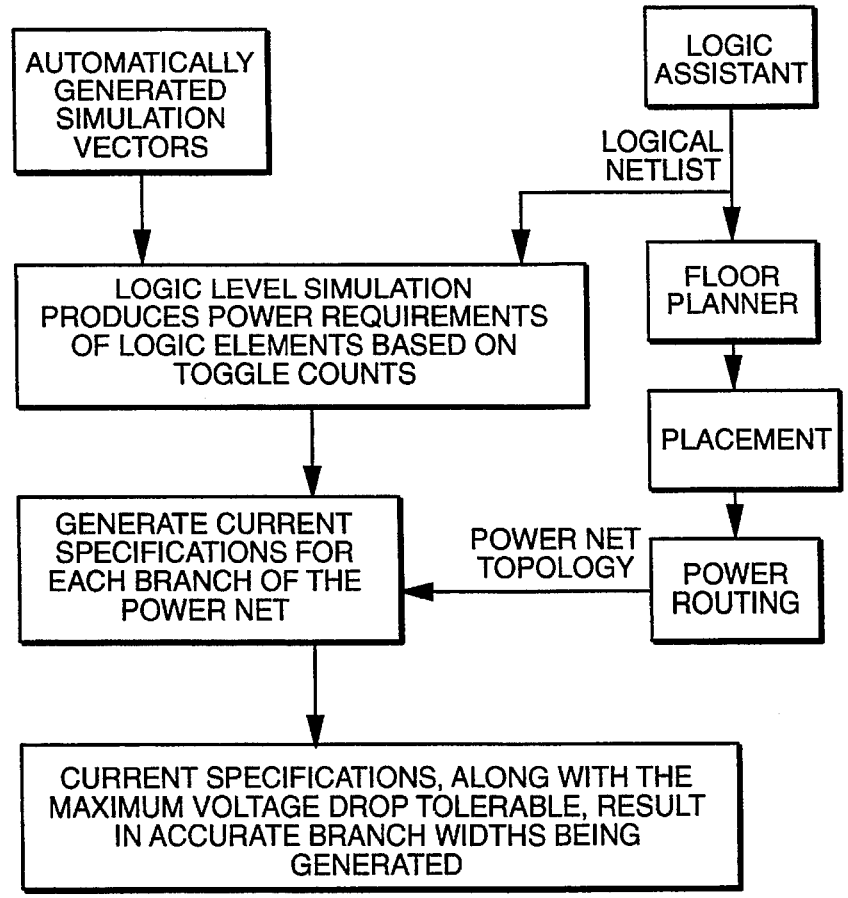
FIG._6

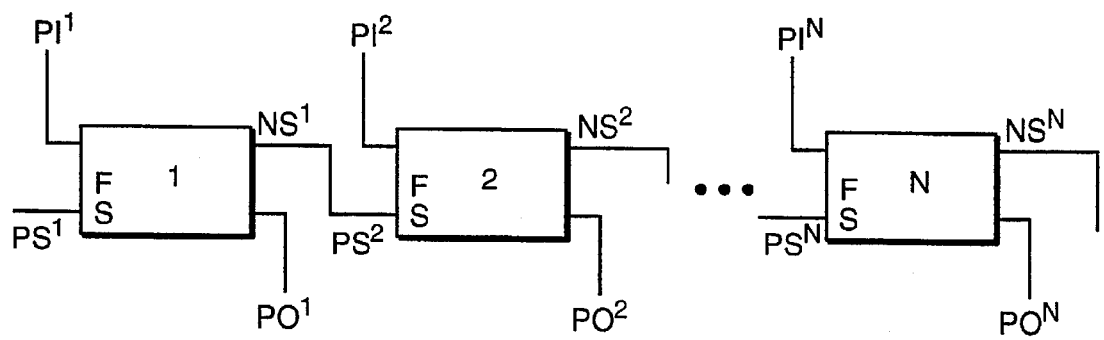
FIG._4
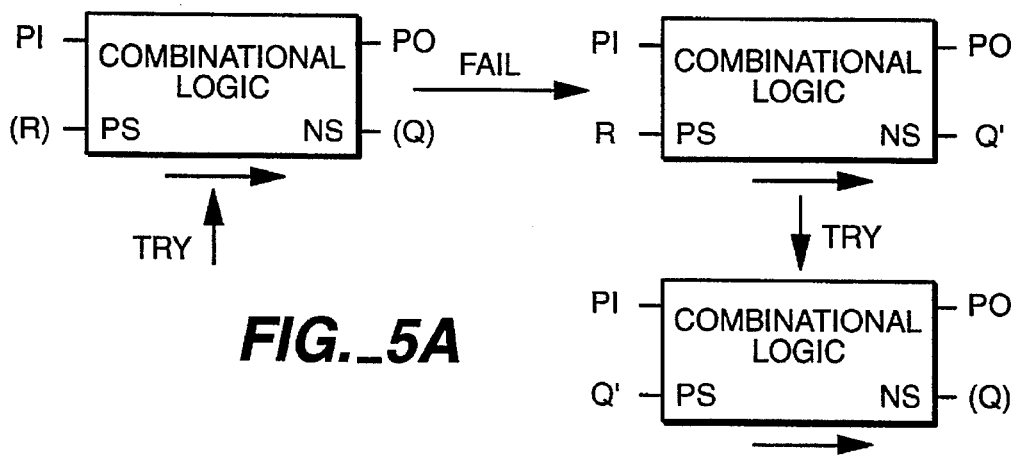
FIG._5A
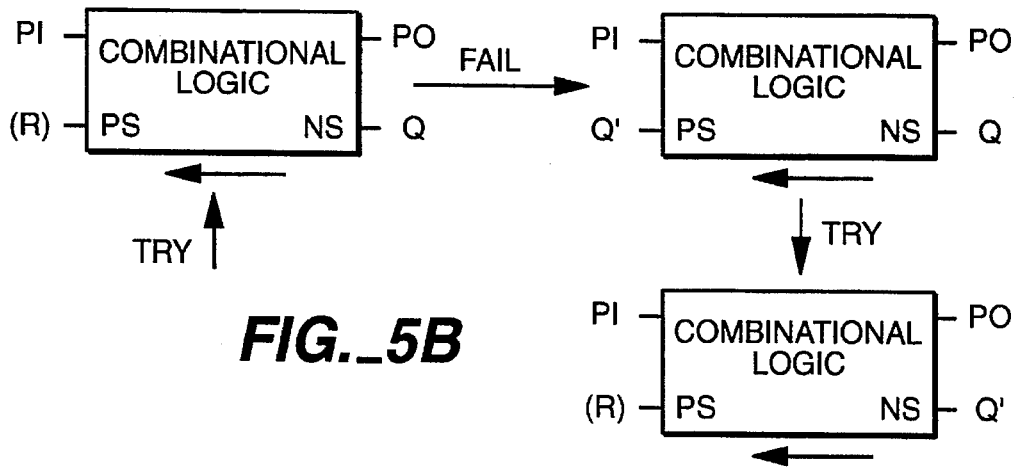
FIG._5B

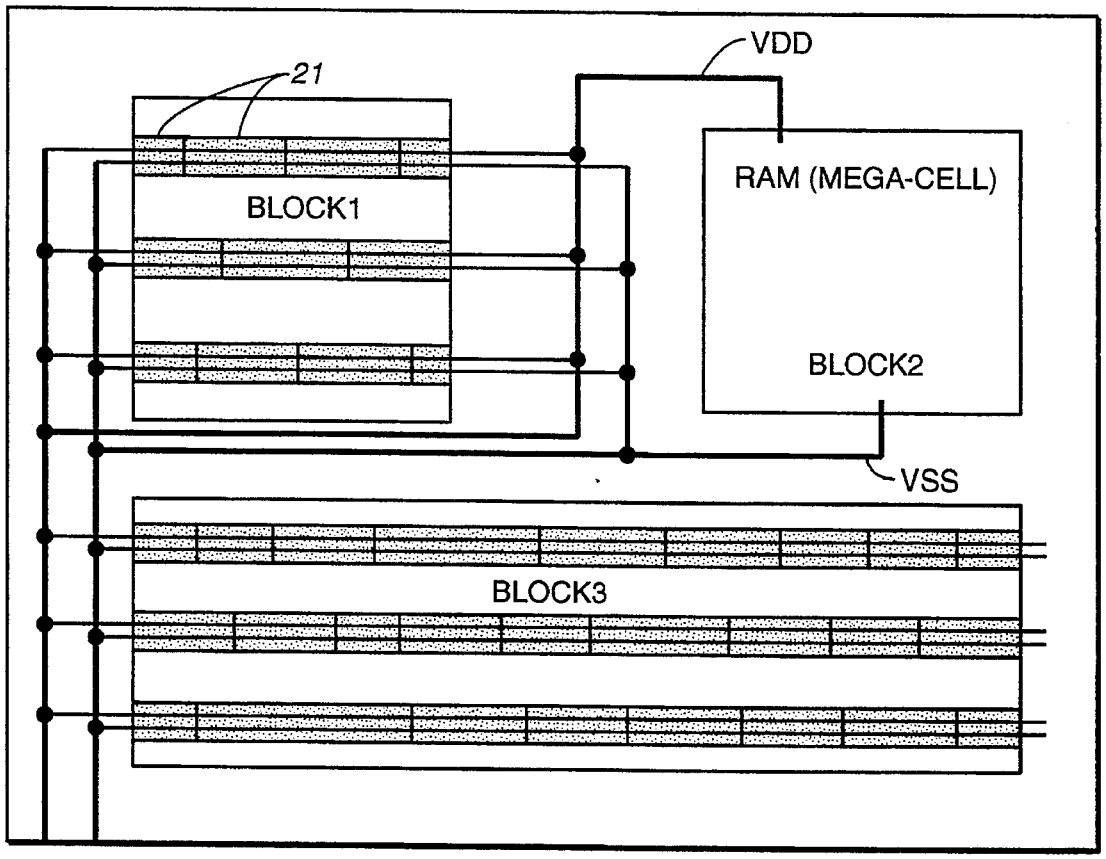
FIG._7
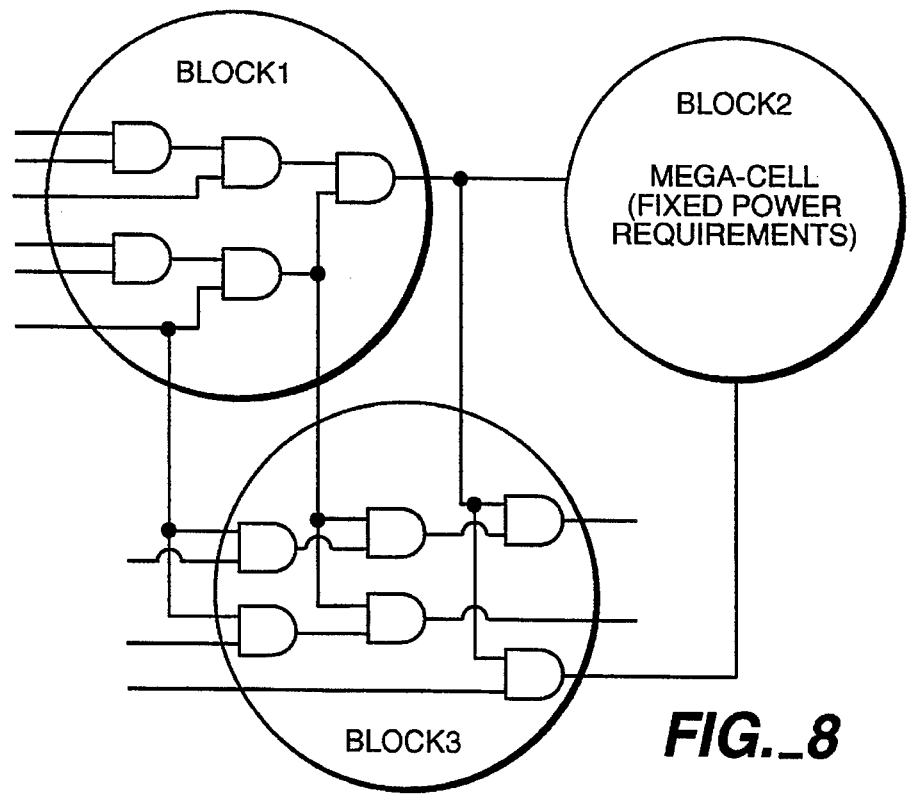
FIG._8

AUTOMATIC POWER VECTOR GENERATION FOR SEQUENTIAL CIRCUITS

This application is a continuation, of Application No. 08/120,627, filed Sep. 13, 1993, now abandoned.

FIELD OF THE INVENTION

The present invention relates to integrated circuit design/ layout and layout and more particularly to the estimation of power dissipation in integrated circuits.

STATE OF THE ART

The high transistor density now possible with CMOS integrated circuits has made power dissipation an important design consideration. However, power dissipation in a logic circuit is a complex function of propagation delays, device parameters, specific topology, and, most importantly, the input vector or vector sequence applied. The dependence of power dissipation on the input vector sequence makes accurate estimation of worst-case power dissipation extremely difficult, since the number of input sequences that have to be simulated in order to find the sequence that produces the maximum power dissipation is exponential in the number of inputs of the circuit.

Estimating worst-case power dissipation in logic circuits is an important problem. Using electrical current specifications for each branch of the power net of an integrated circuit, along with the maximum voltage drop tolerable, accurate sizing of power bus widths may be achieved.

This estimation is used during logic synthesis/technology mapping to produce circuits that meet power specifications.

During netlist partitioning into packages and/or package selection, knowing circuit worst-case-power-consumption aids in matching packages with netlist partitioning.

A method of combinatorial CMOS circuit automated power vector generation has already been developed and is described in S. Devadas, K. Keutzer, and J. White, "Estimation of Power Dissipation in CMOS Combinational Circuits", *Custom Integrated Circuits Conference,* 1990, Session 19.7, the non-essential subject matter of which is incorporated herein by reference. The method is not applicable to and does not address estimation of power dissipation in sequential circuits. Whereas in combinational circuits the circuit output at any given time is a function only of the circuit input at that time, in sequential circuits, the circuit output at any given time is a function of the current circuit input as well as previous circuit inputs.

For sequential circuits, prior methods of automatic test pattern generation have been used to produce test vectors used to test the chip after fabrication. Traditional methods for automatic test pattern generation use binary stuck-at fault models. In accordance with a binary stuck-at fault model, the only faults considered are those in which a line is stuck at either a binary 0 or a binary 1. The objective of traditional methods has been to find the minimum number of input vectors that will detect all possible logical faults (stuck at 0 and stuck at 1). One approach to test pattern generation for synchronous sequential circuits is described in H.K. Tony, S. Devadas, R. Newton, and A. Sangiovanni-Vincentelli, "Test Generation For Sequential Circuits", *IEEE Transactions On Computer-Aided Design,* vol. 7, No. 10, October 1988, 1081–1093, the non-essential subject matter of which is incorporated herein by reference.

What is needed is a method for automatic power vector generation for sequential circuits which produces input vectors for a power simulation required for accurate calculation of the power dissipation of logic elements.

SUMMARY OF THE INVENTION

The present invention, generally speaking, provides a method for automatic power vector generation for sequential circuits which produces input vectors for a power simulation required for accurate calculation of power dissipation of logic elements. More particularly, a worst-case-power-consumption logic vector pair for a sequential circuit is automatically generated by determining the worst-case-power-consumption logic vector pair, the second worst-case-power-consumption logic vector pair, up to the Nth worst-case-power-consumption logic vector pair in the combinatorial logic portion of the sequential circuit. The following is determined with respect to each of the N vector pairs: whether a feedback portion of a second logic vector in the logic vector pair is consistent with a feedback portion of a first logic vector output signal of the sequential circuit produced in response to a first logic vector in the logic vector pair, signifying that the second logic vector can be produced from the first logic vector; and, a setup vector sequence, for the first logic vector, of one or more logic vectors that when applied to the sequential circuit causes the feedback portion of the first logic vector to be produced, if such a setup sequence can be found. This procedure continues until for a particular logic vector pair the second logic vector can be produced from the first logic vector, and a setup vector sequence for the first logic vector has been found. The particular logic vector pair is then the worst-case-power-consumption logic vector pair. The worst-case-power-consumption logic vector pair and the corresponding setup vector sequence can then be used with a power simulation to find worst-case-power-consumption of the sequential circuit.

BRIEF DESCRIPTION OF THE DRAWINGS

The invention may be further understood from the following description in conjunction with the appended drawings. In the drawings:

FIG. 1 is a Venn diagram of a usable vector transition search space containing for a particular sequential circuit all physically possible worst-case-power-consumption logic vector pairs;

FIG. 2 is a block diagram of a sequential circuit;

FIG. 3 is a logic diagram of a two-level inverter-AND network;

FIG. 4 is a block diagram illustration of a iterative array model for sequential circuits;

FIGS. 5A and 5B are block diagram illustrations of forward state justification and backward state justification, respectively;

FIG. 6 is a flow graph for accurately sizing power bus widths;

FIG. 7 is a floor plan of an integrated circuit; and

FIG. 8 is a simplified gate level logic diagram of the integrated circuit of FIG. 7.

DETAILED DESCRIPTION OF THE PREFERRED EMBODIMENTS

A particular virtue of CMOS logic circuits is that they only dissipate energy when their node voltages are changing. This behavior suggests that computing power dissipation for CMOS circuits involves finding the circuit's transient response. A very simple relation between the logical behavior of CMOS combinational networks and the energy the circuits dissipate can be derived based on three simplifying assumptions: that the only capacitance in a CMOS logic gate is at the output node of the gate; that either current is flowing through some path from $V_{DD}$ to the output capacitor or current is flowing from the output capacitor to ground; and that any change in a logic gate output voltage is a change from $V_{DD}$ to ground or vise-versa. All of these are reasonably accurate assumptions for well-designed CMOS gates. From these simplifying assumptions, the result follows that maximizing the energy dissipated by a CMOS combinational network over the possible input vector sets involves maximizing the weighted sum of logic gate output transitions, where the weights are given by the gate output capacitance.

In simple terms, in order to simulate worst-case-power-consumption, the vectors used in the power simulation must toggle all circuit elements which can possibly be toggled at the same time. If the entire circuit can be toggled at the same time, then a worst-case CMOS power requirement scenario has occurred, in which case a simple worst-case power-table lookup could have been performed using a table derived from statistical experimental data. However, most circuits do not toggle every element at the same time.

The present method may be used to accurately size power bus widths by recording groups of elements that toggle at the same time for a given set of vectors at any given time frame in the power simulation. When combined with placement data (i.e., bloch of elements placed at physical locations on a chip), the worst-case power of a physical block is found. The power requirements may be extracted for each block and used to size power muting bus widths. The worst-case circuit power can also be used during logic synthesis/ technology mapping to produce circuits that meet power specifications. During netlist partitioning circuits into packages and/or package selections, knowing circuit worst-case power consumption aids in matching packages with netlist partitioning.

The present method of automatic power vector generation is described succinctly by the following algorithm:

```
N:=1;
Repeat
    V1,V2:=FindNthPowerVectorPair(N); # Step 1.
    If (VI,V2) then    # Step 2.
        FlipFlop_States:=SeeIfAV2CanBeProducedFromAV1
(V1,V2);
    If FlipFlop_States then    # Step 3.
        SetUpVectors:=FindJustificationSequenceForV1
(FlipFlop_States);
    If SetUpVectors then accept (V1,V2,SetUpVectors)
    else store (V1,V2 as the Nth Power Vector Pair);
    N:=N +1;
Until(V1,V2, and SetUpVectors found);
```

The method generally speaking, proceeds in three steps. Referring to FIG. 1, in a first step, possible V1, V2 vector transitions which toggle some circuit elements that consume a large amount of power within a combinatorial block are identified, ignoring the sequential structure. By initially ignoring the sequential structure, previous techniques of estimating worst-case power dissipation in CMOS combinational circuits are made applicable.

Referring briefly to FIG. 2, a general synchronous sequential circuit is realized by combinational logic and feedback registers. The feedback registers are typically formed by flipflops. The output signals of the flipflops at a particular time are referred to as the present states (PS). The inputs to the flipflops are referred to as the next states (NS). Upon occurrence of a clock signal, all of the flipflops are clocked such that the next states become the present states. Inputs to the combinational logic circuit include both user controllable inputs, known as primary inputs (PI), and the present states (PS). Outputs of the combinational logic circuit include both user observable outputs, known as primary outputs (PO), and the next states (NS).

Referring again to FIG. 1, the second step in the automatic power vector generation method is to identify a subset of the "high power" vector transitions that satisfy the condition that PS(V2)=NS(V1). In other words, since the next states produced in response to vector V1 will become the present states of vector V2, the vectors must match in this respect.

Note, however, that vector V1 is the concatenation of the primary (user controllable) inputs PI(V1) and the present states PS(V1) (not user controllable). That the present states of vector V1 can even be caused to occur is not assured. The present states of vector V1 may be caused to occur by, starting from a reset condition, applying a sequence of vectors to the sequential circuit. If there exists a sequence of vectors that causes the present states of vector V1 to occur, the sequence of vectors is called a setup vector sequence, or justification sequence. In a third step of the automatic power vector generation method, therefore, a further subset of vector transitions is identified in which the present states of the vector V1 can be justified.

Each of the foregoing steps of the automatic power vector generation method will presently be described in greater detail.

Again, the first step is to identify "high power" vector transitions V1, V2 ignoring the sequential structure of the circuit. As described in Devadas, a simplified model of power dissipation relates maximizing dissipation to maximize gate output activity, appropriately weighted to account for different load capacitances. To find the input or input sequence that maximizes the weighted activity, the problem is first transformed to a weighed max satisfiability problem. That is, a logic description of the combinatorial circuit is converted into a multiple output Boolean function of the input vector or vector sequence where each output of the Boolean function is associated with a logic gate output transition. An assignment to the input vector or vector sequence which results in a maximum weighted number of these functions' outputs becoming one corresponds to the input vector or vector sequence causing maximum weighted activity.

Under a unit delay model, output transitions are assumed to happen one unit-delay following input transitions. Even under the idealization of a unit-delay model, however, the gate output nodes of a multi-level network can have multiple transitions in response to a two-vector input sequence. In fact, it is possible for a gate output to have as many transitions as levels in the network.

To address this problem, the Boolean functions describing the gate outputs at the discrete points in time implied by the unit-delay model are constructed. That is, only discrete times t,t+1, . . . ,t+l are considered, where t is the time when the input changes from v1 to v2 and l is the number of levels in the network. For each gate output i, symbolic simulation may be used to construct the l boolean functions $f_i(t+j)$, j∈0, . . . , l which evaluate to 1 if the gate's output is 1 at time t+j. Assuming no gate has zero delay and that the network has settled before the inputs are changed from V1 to V2, $f_i(t)$ is the logic function performed on V1 at the $i^{th}$ gate output. Finally, whether a transition occurs at a boundary between discrete time intervals t+i and t+i may be determined by XORing $f_i(t+i)$ with $f_i(t+i+1)$.

For example, consider the two-level inverter-AND network in FIG. 3. For this network.

$f_1(t) = \overline{vo_1}$ $f_2(t) = \overline{vo_1} \wedge vo_2$

Assuming both gates have unit delay, $f_1(t+1) = \overline{i_1(t)} = \overline{vt_1}$ $f_2(t+1) = f_1(t \wedge i_2(t) = \overline{vo_1} \wedge vt_2$ Finally, $f_2(t+2) f_1(t+1) \wedge i_2(t+1) = \overline{vt_1} vt_2$ For this example there are three possible transitions: that the inverter changes state from t to t+1, that the AND gate changes state from t to t+1, and that the AND gate changes state from t+1 to t+2. The boolean equations for these transitions are respectively:

$e_1 = f_1(t) \oplus f_1(t+1)$ $e_2 = f_2(t) \oplus f_2(t+1)$ $e_3 = f_2(t+1) \oplus f_2(t+2)$ Note, if it is possible to find a two-vector sequence V1, V2 that simultaneously satisfies $e_1$, $e_2$ and $e_3$, V1, V2 is the input sequence that will maximize dissipation.

It is not usually necessary to generate an $f_i(t+j)$ for all values of j between 0 and 1, since many of these terms can be discarded by considering two easily computed quantifies, namely rainrank and maxrank. The minrank of a logic gate output is one plus the minimum of the minranks of the logic gate's inputs. Primary inputs have a rainrank of zero. The maxrank of a logic gate output is one plus the maximum of the maxranks of the logic gate's inputs. Primary inputs have a maxrank of zero.

It may be shown that the boolean equations for all possible transitions of the $i^{th}$ logic gate can be determined from XORing neighbors in the ordered set of Boolean functions.

This result follows directly from the unit delay model. A gate output cannot change until the change in the nearest input propagates through, and will stop changing when the input furthest away finally arrives.

The max-satisfiability problem can be solved using a branch-and-bound strategy. The efficiency of any such algorithm depends greatly on the pruning/bounding methods that are used while branching over various solutions.

An algorithm using a pruning method based on a maximal disjoint set heuristic is described below. The algorithm assumes that the ON-sets of the M outputs in the multiple-output Boolean function, in sum-of-product form, are given. The set LI corresponds to the set of all N outputs. The set L corresponds to the current set of selected outputs. The set R corresponds to the currently remaining outputs. Initially, $R=U$, $L=\phi$.

1. Remove all outputs from R whose ON-sets have a null intersection with the intersected ON-sets of the current element set L.

2. Find a maximal set of maximal disjoint groups of outputs in R, namely $D_1, D_2, \ldots D_M$. A disjoint group of outputs satisfies the property that the pairwise intersection of their ON-sets is null. No output can belong to more than one $D_i$. If $$\left( \|L\| + \|R\| - \sum_{i=1}^{M} (\|D_i\| - 1) \right)$$

is less than or equal to the best solution found thus far, return from this level of recursion. Else, if $R=\phi$ and this solution is not one of the (1 to N-1)[15] worst-power vector pairs, declare this solution as the best recorded thus far.

3. Heuristically select an output f from R (Its ON-set will have a non-nul intersection with the intersected ON-sets of the selected output set, L). Recur with $L = L \cup f$ and $R=R-f$. Recur also for L unchanged, $R=R-f$.

The bounding strategy used is as follows: If at any given point in the algorithm a group of outputs in R has pairwise ON-set intersections that are all null, it implies that at most one output can be selected from the set. This corresponds to the $\|D_i\|-1$ term in Step 2 above. Finding a maximum disjoint group is itself NP-complete; however, only a large disjoint group need be found, and a fast, greedy algorithm can be used for this purpose. By finding large, disjoint groups efficiently, the search space can be pruned considerable and many searches can be terminated high up in the recursion.

As the Nth worst-case-power-consumption logic vector pairs are found, the automatic power vector generation method checks to see if the second vector of each pair can be produced from the first vector. If so, then a search is conducted to see if the first vector can be justified, i.e., can be produced by means of a setup vector sequence.

Referring again to FIG. 2, in an ideal model of a sequential circuit there is one combinatory block with I/O connections to pads or to flipflops. Connections to pads are primary inputs or primary outputs, directly accessible to outside. In other words, any primary input vector can be applied directly to the circuit.

Connections to flipflops from the next state outputs are fed back to the present state inputs after a clock pulse. The feedback loop may cause the worst-case vector transition of the combinatorial circuit to not be possible. That is, the circuit may never be put into the state required to produce the vector transition.

The ideal model assumes the following:

The circuit is synchronous (i.e., there is only one clock); and,

Each flipflop has one input and one output. Other sequential element features can be mimicked with surrounding combinatorial logic that is considered part of the combinatofial block.

The conventional iterative array model used in sequential test generation is shown in FIG. 4. A similar model may be used to find a justification sequence for a high-power vector pair in the present automatic power vector generation method. In terms of the iterative array model used in sequential test generation, the combinational logic block of the original sequential machine (FIG. 2) with a fault, F, to be detected, has been duplicated in each time frame. Beginning with the present state lines in time frame 1, $PS^1$, set to the reset state values, an input sequence is sought, $PI^1, PI^2, \ldots, PI^n$, for some n, which when applied to time frames 1, 2, $\ldots$, n propagates the effect of the fault F to the primary output lines of the nth time frame, $PO^n$. This input sequence is called a test sequence for the fault.

A state is considered as a bit vector of length equal to the number of memory elements (latches or flip-flops) in the sequential circuit. In general, a state is a cube; i.e., the values of the different bit positions (state lines) may be 0, 1, or X (don't care). A state with only 0's or 1's as bit values is called a minterm state.

A state is said to cover another state if the value of each bit position in the first state is either an X or is equal to the value of the corresponding bit position in the second state.

The process of finding an input sequence which places the machine, initially in its reset state, R, into a given state, S, is called state justification. The input sequence in question is called a justification path. State justification may be forward state justification (FIG. 5A) or backward state justification (FIG. 5B), depending on whether the search is conducted from R forward or from S backward.

The search space in sequential test generation is deemed to be the product of two spaces, namely the input space and the state space. The dimension of each space is equal to the number of primary inputs. These spaces correspond to the universal input cube and the universal state cube, respectively (the universal cube is a cube with all X entries of length equal to the dimension of the space).

A space can be enumerated by exhaustively searching a set of cubes which add up to the universal cube corresponding to that space. Minterm enumeration implies that each cube searched is a minterm. Minterm enumeration on an n-dimensional space implies that $2^n$ combinations have been searched. Implicit enumeration (or implicit cube enumeration or cube enumeration) involves exhaustively searching an n-dimensional space via cubes such that the number of cubes searched is significantly less than $2^n$.

Given a goal state SO, the state justification algorithm (SJ) attempts to find a path (setup sequence) from the reset state to the goal state. SO can be a cube containing don't care state bits or a minterm with every state bit specified. In the case of a cube, SJ needs only to find a path to any minterm state that is covered by SO.

The SJ algorithm performs backward justification from SO to R, given a prescribed limit on the number of backtracks, to bound CPU time usage. First, SJ sets the next state lines to SO and enumerates all the fan-in edges to SO. SJ then checks to see whether any of the states the edges fan out from cover the reset state or a state in a state transition graph (STG) of the circuit. If such a state exists, a path is found. Otherwise, SJ picks each fan-in state as a new goal state and carries out fan-in edge enumeration again. The procedure is repeated until a path is found or no path can be found. SJ actually proceeds in a depth-first fashion and there is a limit on the maximum length of the justification sequence.

In the fan-in edge enumeration algorithm multiple line (the next state line) values are to be justified simultaneously rather than a single output line as in previous enumeration algorithms (for example, PODEM). The concept of state space enumeration is also employed in SJ. There are two decision trees are maintained, one (D1) for the primary inputs and the other (D2) for the present state lines. All the present state lines and primary inputs are set to unknown values initially. Through backtracking and backtracking processes, the primary inputs and present state lines are continuously set to some known values, 1 or 0, until all the next state lines are found to be set to their specific values through simulation. Whenever the search for a new fan-in edge is begun, D1 is completely scratched but D2 is retained. Immediately, backtracking is done on D2. Then, the enumeration procedure is repeated again with a new fan-out state. All edges (fanning out of disjoint states) fanning into a state have been implicitly enumerated when no more backtracking is possible. The pseudocode below illustrates the state justification algorithm proceeding in depth-first fashion. Breadth-first search is an alternative.

```
Justify_State (State)
{
        PresentStateLines(ps)=unknown;
        PrimaryInputs(pi)=unknown;
        simulate the circuit;
        while(not all fan-in states to State are enumerated)
        {
                while(not all the NextState lines are justified) {
                find new_pi/ps_assignment();
                simulate circuit with current set of pi/ps assignments;
                if(there are conflicts on NextState line values)
                {
                        backtrack to the last pi in D1 or ps in D2
                                and assign an alternative value to it;
                        stimulate with current set of pi and ps assignments;
                }
        }
        if(a fan-in state is found) {
                if(fan-in state covers reset state in partial STG)
                {
                        a path is found;
                        return;
                }
                else Justify_State(fan-in state);
        }
        if(a path is not found) {
                /*scratch D1*/
                scratch all pi assignments;
                backtrack to the last set ps in D2 and
                assign an alternative value to it;
                stimulate with current set of ps assignments;
```

```
        }
    }
}
```

When an Nth worst-case-power-consumption vector pair is found in which V1 and V2 "match" and in which V1 can be justified, the vector pair is the worst-case-power-consumption vector pair. The worst-case-power-consumption vector pair may then be used for accurately sizing power bus widths in a manner to be presently described.

Referring to FIG. 6, integrated circuit design and layout is performed using a logic design tool, shown in FIG. 6 as "logic assistant", and a suit of layout tools including a floor planner, a placement algorithm and a power router. The logic assistant produces a logical netlist that completely describes the integrated circuit logic. Using automatically generated simulation vectors generated in accordance with the previously described method, together with the logical netlist produced by the logic assistant, a logic level simulation may be performed that produces power requirements of logic elements based on toggle counts. The power simulation proceeds by applying to the circuit during circuit simulation the justification sequence J, identified during automatic power vector generation. The primary inputs $PI_1$ of vector V1 are then applied to the circuit during the simulation. Finally, the primary inputs $PI_2$ of vector V2 are applied, the clock is activated, and, at the same time, a measurement of power consumption is obtained based on toggle counts. Given the power requirements of logic elements produced by simulation and the power net topology produced by the power router, current specifications may be generated for each branch of the power net. The current specifications, along with the maximum voltage drop tolerable, results in accurate branch widths being generated.

Referring to FIG. 7, Block 1, Block 2 and Block 3 are physical blocks corresponding to groups of logical elements in an integrated circuit. Each instance 21 corresponds to a logical element. As shown in greater detail in FIG. 8, Block 1 and Block 3 in the present example are composed of combinatorial logic gates. Block 2 is a mega-cell (for example RAM or ROM) having fixed power requirements. The simulation of the power vectors determines the worst-case number of logical elements to be turned on at the same time in each group, allowing accurate power bus widths to be generated.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of automatically generating a worst-case power-consumption logic vector pair for a sequential circuit, the sequential circuit comprising a combinatorial logic circuit and a logic feedback circuit, the method comprising the steps of:

determining with respect to the combinatorial logic circuit the worst-case power-consumption logic vector pair, the second-worst-case power-consumption logic vector pair up to the Nth-worst-case power-consumption logic vector pair, each logic vector pair having a present state portion and a next state portion;

determining with respect to the logic vector pairs:

whether the present state portion of the second logic vector in the logic vector pair is consistent with the next state portion of the first logic vector of the logic vector pair, signifying that the second logic vector can be produced from the first logic vector; and a setup vector sequence. for the first logic vector, of one or more logic vectors that when applied to the sequential circuit causes the present state portion of the first logic vector to be produced, if such a setup vector sequence can be found;

until for a particular worst-case power-consumption logic vector pair the second logic vector can be produced from the first logic vector, and a setup sequence for the first logic vector has been found, the particular logic vector pair being the worst-case power-consumption logic vector pair for the sequential circuit;

determining from the worst-case power-consumption logic vector pair for the sequential circuit the worst-case power consumption of the sequential circuit; and sizing a power bus of the sequential circuit in accordance with said worst-case power consumption of the sequential circuit.

* * * * *